Aug. 27, 1935.    J. C. ROGERS    2,012,520
COMBINATION BROILER GRID AND PAN
Filed Jan. 24, 1935    2 Sheets-Sheet 1
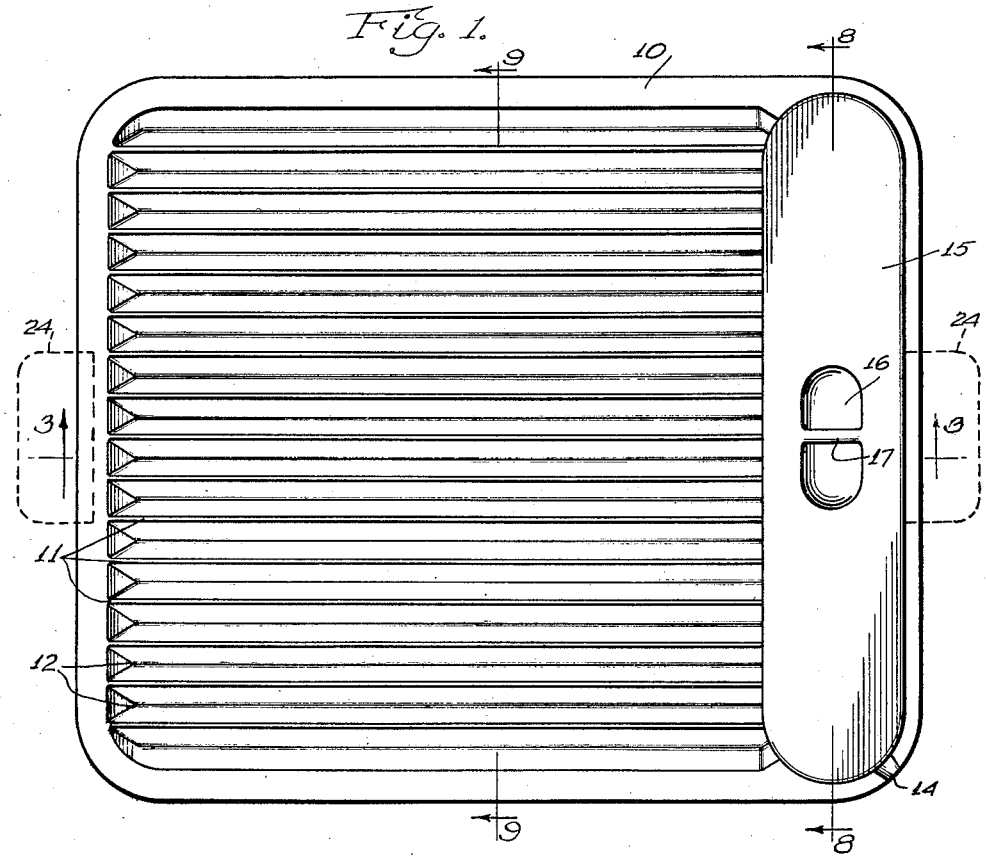
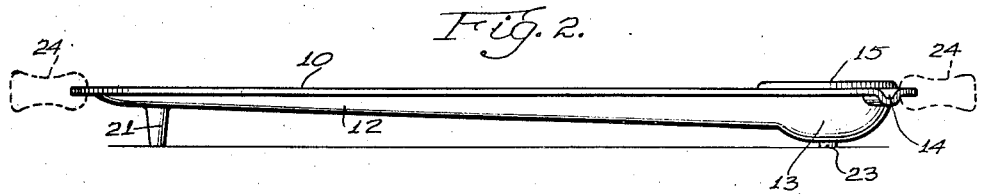
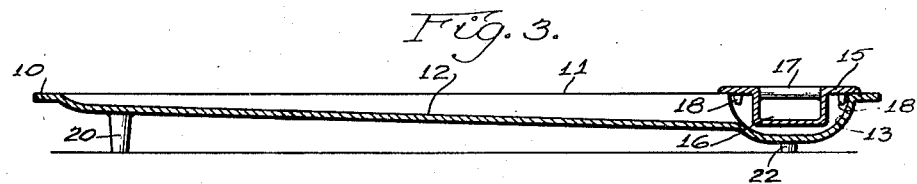

Aug. 27, 1935.   J. C. ROGERS   2,012,520
COMBINATION BROILER GRID AND PAN
Filed Jan. 24, 1935   2 Sheets-Sheet 2
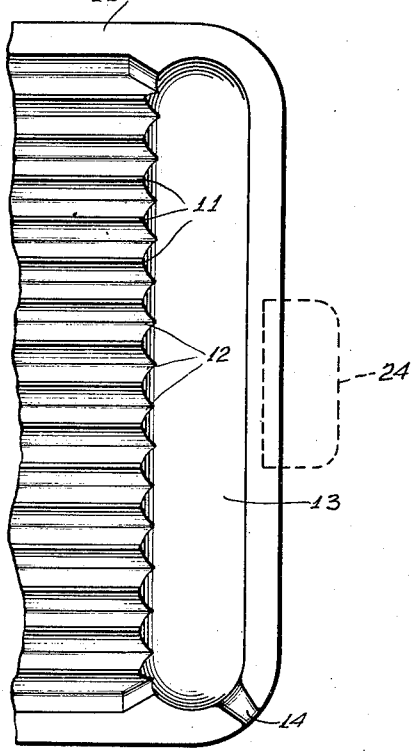
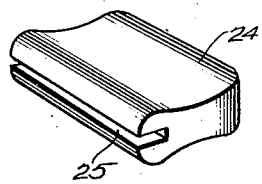
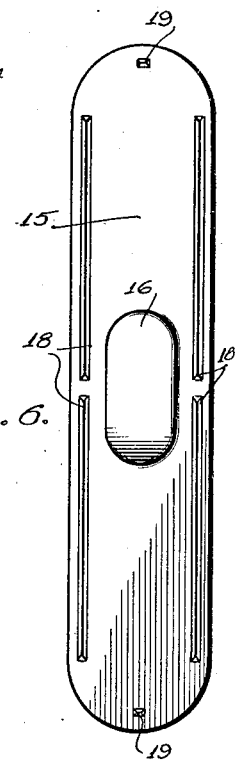
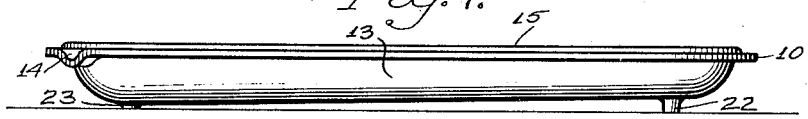
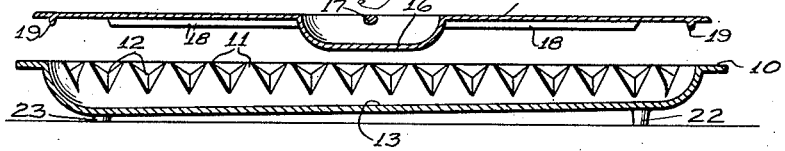

Patented Aug. 27, 1935

2,012,520

UNITED STATES PATENT OFFICE 2,012,520

COMBINATION BROILER GRID AND PAN

John C. Rogers, Cicero, Ill., assignor to Crown Stove Works, Cicero, Ill., a corporation of Illinois Application January 24, 1935, Serial No. 3,252

4 Claims. (Cl. 53—5)

This invention relates to the general art of cooking utensils, and has reference more particularly to broilers.

The present invention relates to a known type of broiler wherein the broiler grid and the drain pan are made as a unitary structure, so that the two do not have to be handled separately during the broiling and serving of steaks, chops and the like; and a general object of the invention is to provide an improved and more efficient combination broiler grid and drain pan of this general type. Other objects are, to provide a combination broiler grid and pan that may be handled with ease and without danger of burning the hands, to provide a broiler which will collect and conserve all of the meat juices that run off during cooking and enable them to be easily poured off, and to provide a one-piece broiler grid and pan of simple and cheap construction and high efficiency.

Still other objects and advantages of the invention will be apparent to cooks and other persons familiar with the art from the following detailed description, taken in connection with the accompanying drawings, in which I have fully illustrated one practical and approved embodiment of the invention, and wherein:—

Fig. 1 is a top plan view.

Fig. 2 is a side elevation, viewed from the bottom of Fig. 1.

Fig. 3 is a longitudinal section on the line 3—3 of Fig. 1.

Fig. 4 is a fragmentary top plan of the drainage end, with the cover of the drain receptacle removed.

Fig. 5 is a detail perspective view of one of the removable wooden handles.

Fig. 6 is a bottom plan view of the removable cover of the drain receptacle.

Fig. 7 is an end elevation, viewed from the right of Fig. 1.

Fig. 8 is a transverse section on the line 8—8 of Fig. 1, showing the cover in raised position.

Fig. 9 is a transverse section on the line 9—9 of Fig. 1.

The article of this invention is preferably an aluminum casting, although the invention is not concerned with either the material used or the method of manufacture. The article might be a sheet metal stamping, or an assembled structure.

Referring to the drawings, 10 designates as an entirety a metal plate of rectangular form with rounded corners, as shown in Fig. 1. On the top surface of this plate are formed a group of parallel grid bars 11 that are separated by intervening channels 12; both the grid bars and channels preferably being of V-shape in cross section, as best shown in Figs. 4 and 9. The tops of the grid bars 11 all lie in the common horizontal plane of the bounding surface of the plate, while the channels 12 are preferably made of gradually increasing depth from end to end, as most clearly shown in Fig. 3.

Extending transversely of the deep ends of the channels 12 and communicating with the latter is a drain receptacle or basin 13. As shown in Figs. 7 and 8, this drain receptacle or basin is preferably made of gradually increasing depth from one end to the other. In the top surface of the margin of the basin, preferably at the deep end, is formed a drain duct 14.

15 designates a removable cover plate for the basin 13. Centrally of the top surface of the cover plate 15 is an oblong countersink 16, between opposite sides of which extends a rod 17 that may be readily grasped by the thumb and finger and constitutes a simple handle for applying and removing the cover. Also, on the underside of the cover plate 15 are preferably formed a pair of longitudinal ribs 18 that, through contact with the outer side wall of the basin 15 and the opposed ends of the grid bars 11, serve to accurately center the cover plate on the basin and prevent it from sliding laterally off the latter. A pair of lugs or teats 19 on the ends of the under surface of the cover plate have a similar function to prevent the cover plate from sliding off the grid plate endwise.

A pair of supporting legs 20 and 21 depending from the bottom walls of the shallow ends of two of the channels 12, and a pair of legs 22 and 23 similarly depending from the ends of the bottom wall of the basin 12 serve to support the structure on a rest, such as a table top, with the top edges of the grid bars in a horizontal plane; for which purpose the several legs are made of a length such that their lower ends are all in a plane parallel with the plane of the top edges of the grid bars.

For greater convenience in manipulating the broiler, and to avoid the danger of burning the hands in removing it from the oven or the stove top when hot, I preferably provide a pair of wooden handles, one of which is shown in detail in Fig. 5 and consists of a wooden block 24, in one longitudinal edge of which is formed a groove or kerf 25 of a width to fit an edge of the broiler plate under sufficient friction to prevent relative sliding movement when the grid plate is tilted to pour off the juices from the basin 13. Of course, during the broiling operation, these removable handles 24 are withdrawn.

In the use of the broiler above described, the steaks or chops are laid across the grid bars, and the broiler is placed either in the oven or on top of the stove over a gas burner or other fire. As the broiling proceeds, the juices fall into the inclined channels 12 and flow down the latter into the drain receptacle or basin 13, collecting in the deep end of the latter. This basin is, of course, of ample size to hold the maximum amount of juices that will drip and drain out of the meat during the cooking operation. The cook then grasps the opposite edges of the broiler plate by means of the handles 24 and removes the same to a suitable rest or support such as the stove top or a table top, removes the broiled meat, and then, by picking the broiler up by the handles 24 and tilting it cornerwise, the extracted juices are poured off through the duct 14 onto the platter or into a gravy bowl.

During the broiling operation, the cover plate 15 prevents the juices from cooling and, at the same time, prevents their accidental ignition from the flames of an overhead burner.

In the preferred form shown, the entire article, with the exception of the cover plate 15 of the basin, is an integral or one-piece structure which combines the functions of the ordinary broiler grid and the ordinary drip pan underlying the same, thus conducing to ease in manual manipulation, and making it possible to use the article either in the oven or on top of the stove, as may be preferred. The drain receptacle or basin 13 obviously collects and conserves all of the meat juices that run off during cooking and enables them to be easily poured off without liability of accidental spilling. When made as described, with the drain channels sloping into the basin, and with the latter sloping toward one end, the broiler is self-draining by gravity toward one corner, and thus the heat in the juices is better conserved, especially when the cover plate 15 is used.

I have herein shown and described the best physical embodiment of the invention which I have thus far produced, but manifestly the structural details and forms and shapes of the associated parts may be varied, within the scope of the appended claims, without departing from the substance or essence of the invention.

I claim:

1. As a new article of manufacture, a combination broiler grid and pan, comprising a plate having alternate grid bars and drain channels on its top surface, and a drain receptacle extending transversely of said bars and channels with which said channels communicate, and a removable flat cover plate for said receptacle, said cover plate adapted to seat on the top edge of said receptacle and having a handle on its upper side and a pair of longitudinal ribs on its under side for centering it between the outer longitudinal edge of said receptacle and the opposed ends of said grid bars.

2. As a new article of manufacture, a combination broiler grid and pan, comprising a plate having alternate grid bars and drain channels on its top surface, and a drain receptacle extending transversely of said bars and channels with which said channels communicate, and a removable flat cover plate for said receptacle, said cover plate adapted to seat on the top edge of said receptacle and having a handle on its upper side, a pair of longitudinal ribs on its under side for centering it between the outer longitudinal edge of said receptacle and the opposed ends of said grid bars, and lugs on the under side of its end portions for centering it between the end edges of said receptacle.

3. As a new article of manufacture, a combination broiler grid and pan, comprising a plate having alternate grid bars and drain channels on its top surface, and a drain receptacle extending transversely of said bars and channels at one end of said plate into which said channels drain at one end thereof, said receptacle being of gradually increasing depth from one end to the other.

4. As a new article of manufacture, a combination broiler grid and pan, comprising a plate having alternate parallel grid bars and drain channels on its top surface, said channels being of gradually increasing depth from one end to the other, a drain receptacle extending transversely of said bars and channels and communicating with the deep ends of the latter, said receptacle being of gradually increasing depth from one end to the other, a pair of legs depending from the bottom walls of the shallow ends of two of said channels, and a pair of legs depending from the ends of the bottom wall of said receptacle, all of said legs being of suitable length to cause the top edges of said grid bars to lie in a horizontal plane when said legs stand on a horizontal supporting surface.

JOHN C. ROGERS.